US012794377B2

(12) United States Patent
Somani

(10) Patent No.: US 12,794,377 B2
(45) Date of Patent: Nov. 10, 2026

(54) APPARATUSES AND METHODS FOR POWER SUPPLY REALIZATION USING MULTIPLE INVERTERS

(71) Applicant: DYNAPOWER COMPANY LLC, South Burlington, VT (US)

(72) Inventor: Apurva Somani, South Burlington, VT (US)

(73) Assignee: DYNAPOWER COMPANY LLC, South Burlington, VT (US)

(*) Notice: Subject to any disclaimer, the term of this patent is extended or adjusted under 35 U.S.C. 154(b) by 145 days.

(21) Appl. No.: 18/837,522

(22) PCT Filed: Feb. 17, 2023

(86) PCT No.: PCT/US2023/062883
§ 371 (c)(1),
(2) Date: Aug. 9, 2024

(87) PCT Pub. No.: WO2023/159226
PCT Pub. Date: Aug. 24, 2023

(65) Prior Publication Data

US 2025/0141368 A1 May 1, 2025

Related U.S. Application Data

(60) Provisional application No. 63/268,140, filed on Feb. 17, 2022.

(51) Int. Cl.
*H02M 7/493* (2007.01)
*H02M 1/00* (2006.01)
(Continued)

(52) U.S. Cl.
CPC ....... *H02M 7/5375* (2013.01); *H02M 1/0048* (2021.05); *H02M 1/36* (2013.01); *H02M 7/493* (2013.01)

(58) Field of Classification Search
CPC .... H02M 7/5375; H02M 1/0048; H02M 1/36; H02M 7/493
See application file for complete search history.

(56) References Cited

U.S. PATENT DOCUMENTS

| | | | |
|---|---|---|---|
| 2010/0246217 | A1 | 9/2010 | Sakakibara |
| 2017/0070158 | A1 | 3/2017 | Kato et al. |

(Continued)

FOREIGN PATENT DOCUMENTS

| | | | |
|---|---|---|---|
| CN | 207234495 | U | 4/2018 |
| CN | 108512407 | B | 9/2018 |

(Continued)

OTHER PUBLICATIONS

International Search Report and Written Opinion, PCT/US2023/062883, Aug. 23, 2023, 13 pages.

(Continued)

*Primary Examiner* — Adolf D Berhane
(74) *Attorney, Agent, or Firm* — Mark H. Williams

(57) ABSTRACT

Electrical power system and methods for operating the power systems are disclosed. Embodiments include power systems configured for connection to loads that include green energy systems, such as hydrogen electrolyzers. Embodiments include multiple subcomponents, for example inverters, that alone produce insufficient power for the load but together produce sufficient power for the load. Embodiments include power systems with subcomponent input ports connected in parallel and output ports connected in parallel. Embodiments minimize the flow of electrical power between subcomponents during startup, and still further embodiments delay connection to the load until sufficient power is available to power the load. Additional embodi- (Continued)

ments allow two or more connected subcomponents to share a load larger than either of the subcomponents is capable of handling alone.

20 Claims, 10 Drawing Sheets

(51) Int. Cl.

| | |
|---|---|
| ***H02M 1/36*** | (2007.01) |
| ***H02M 7/5375*** | (2006.01) |

(56) References Cited

U.S. PATENT DOCUMENTS

| | | | | |
|---|---|---|---|---|
| 2020/0083727 | A1 | 3/2020 | Sun et al. | |
| 2020/0266629 | A1 | 8/2020 | Spooner et al. | |
| 2021/0296922 | A1 | 9/2021 | Sun et al. | |
| 2022/0038025 | A1 | 2/2022 | Liu et al. | |
| 2025/0096577 | A1 * | 3/2025 | Yoscovich | H02J 3/381 |

FOREIGN PATENT DOCUMENTS

| | | | |
|---|---|---|---|
| CN | 111756258 | A | 10/2020 |
| CN | 112350587 | A | 2/2021 |
| CN | 214112335 | U | 9/2021 |
| DE | 102017127311 | A1 | 5/2019 |

OTHER PUBLICATIONS

Extended European Search Report, EP Application No. 23757155.9, Jan. 20, 2026, 11 pages.

* cited by examiner

APPARATUSES AND METHODS FOR POWER SUPPLY REALIZATION USING MULTIPLE INVERTERS

This application claims the benefit of U.S. Provisional Application No. 63/268,140, filed 17 Feb. 2022, the entirety of which is hereby incorporated herein by reference.

FIELD

Embodiments of the present disclosure related generally to electric power systems and methods for powering loads such as hydrogen electrolyzers used in the creation of hydrogen for vehicles powered by fuel cells and a variety of industrial applications, and to systems and methods for starting and operating electrical power systems using multiple electrical converters (for example, converters for converting AC to DC power) that combine their power to generate a larger power output for powering large loads.

BACKGROUND

Inverters may be used in applications that require conversion from direct current (DC) to alternating current (AC). Examples include motor drive inverters which take a DC source (which may be generated by rectifying AC mains voltage) and convert the DC voltage to AC voltage to feed electric motors. Another example is photovoltaic (PV) inverters which take the DC voltage from PV arrays and convert it to AC for feeding into the electric power grid.

Inverters can also be used to perform AC to DC conversion for use as, for example, power supplies. In this situation an inverter can have difficulties during startup and it was realized by the inventor of the present disclosure that inverters can benefit from being fitted with an AC "pre-charge" circuit or a DC "pre-charge rectifier" circuit (also referred to as a "DC jump-start). Both the AC pre-charge and the DC jump-start can generate a DC voltage on the inverter and use this DC voltage to generate a mains synchronized AC voltage and connect the inverter to the mains grid.

It was also realized by the inventor of the current disclosure that problems exist with inverter startup when multiple inverters are connected to one another, such as to create a higher power DC power supply, and that improvements in systems and methods for inverter startup are needed.

Certain preferred features of the present disclosure address these and other needs and provide other important advantages.

SUMMARY

Embodiments of the present disclosure provide improved apparatuses and methods for power supply realization using multiple inverters connected together, for example, multiple paralleled inverters.

In accordance with a first aspect of embodiments of the present disclosure, an AC "pre-charge" circuit and/or a DC jump-start circuit is used for startup of two or more inverters connected to one another that are being used as a power supply. Both the AC pre-charge and the DC jump-start systems and methods can generate a DC voltage on the inverter that can be used for generating a mains synchronized AC voltage and can connect the inverter to the mains grid.

Embodiments of the present disclosure are applicable to use with multiple inverters connected together, such as by being paralleled to one another, to create a higher power DC power supply than when using the inverters individually.

Embodiments of the present disclosure allow connection of two or more connected inverters to a load that exceeds the individual power capability of any one of the two or more connected inverters, and further embodiments reduce losses due to power circulating between the two or more connected inverters and allow the two or more connected inverters to share the load.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
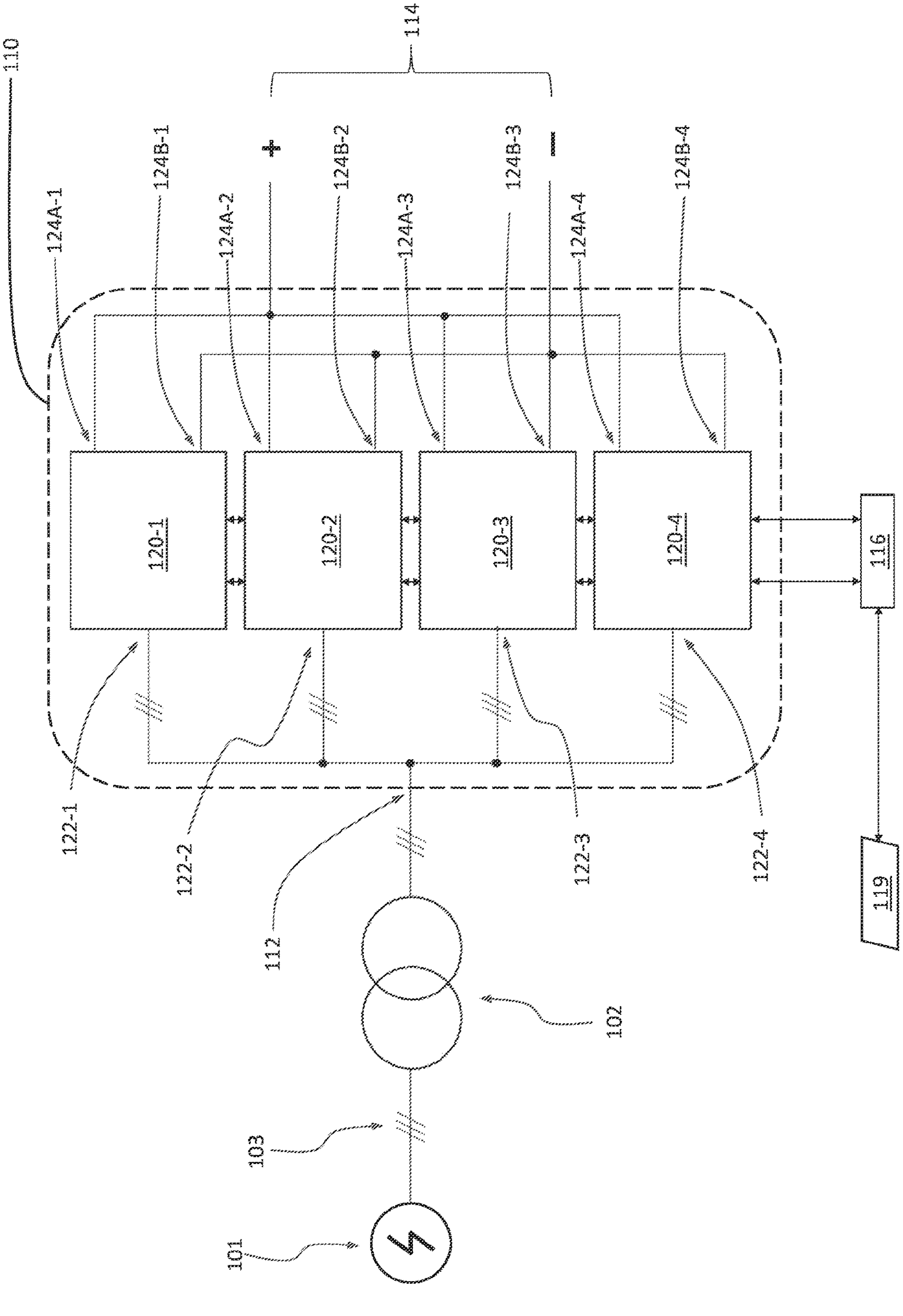
FIG. 1 depicts one or more power systems with four inverters connected together on AC and DC ports according to embodiments of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Depicted in FIG. 1 is a diagram of a power supply 110 with an AC input 112 and a DC output 114. The AC input 112 of power supply 110 may be connected to an electrical grid 101, which may be a 3-phase grid (as denoted by the "///" symbol 103) and/or may be a medium voltage grid. Power supply 110 may also be connected to grid 101 via a transformer (for example, a stepdown transformer 102, which may step the voltage of the grid 101 down to, for example, 600 Vac).

The power supply 110 includes two or more inverters 120 (for example, four inverters 120-1, 120-2, 120-3 and 120-4) that are connected together to share the load. Example embodiments of power supply 110 include two or more inverters 120 that are paralleled on their AC ports 122 (for example, AC ports 122-1, 122-2, 122-3 and 122-4) and paralleled on their DC ports 124A and 124B (for example, DC ports 124A-1, 124B-1, 124A-2, 124B-2, 124A-3, 124B-3, 124A-4 and 124B-4). By having the multiple inverters 120 connected together in this manner, a higher power rating for the power supply 110 can be achieved. The four inverters 120-1, 120-2, 120-3 and 120-4 may have internal switches/contactors that can connect and disconnect each inverter 120 from the inverter's AC input and/or the inverter's DC output.

The four inverters 120-1, 120-2, 120-3 and 120-4 may also be connected to a controller 116, such as via a controller area network (CAN) bus. The CAN bus interface may be used to send start/stop commands and voltage set points to the inverters 110. Interfacing directly between the inverters 110 can be used for synchronization of gating, and in some embodiments one inverter 110 can act as a master and the other inverter(s) can act as slaves, wherein the master sends a repetitive pulses that are synchronized with its own switching and the slaves use this pulse to generate their switching patterns resulting in the slaves being synchronized to the master.

In one example embodiment represented by FIG. 1, each of the four inverters 120 are 1.5 megawatt (MW) inverters paralleled together to create a 6 MW power supply 110. In some embodiments each inverter 120 includes an internal controller that controls the components of inverter 120, and communicates with and receives commands from controller 116.

Embodiments depicted by FIG. 1 are usable with loads with a load activation voltage and do not begin to draw power from their power source (for example, power source 110) until a minimum voltage is reached. For example, loads that perform electrolysis (for example, hydrogen electrolyzers) may not begin drawing current from their power source until the power source presents a minimum voltage (or current) to the load (such as a minimum voltage for the electrolysis process to begin) even when the load is continually connected to the power source. As another example, some loads include an internal switch that will not allow the load to draw power from a power source until the power source has reached a minimum voltage (or current).

Figure 2:
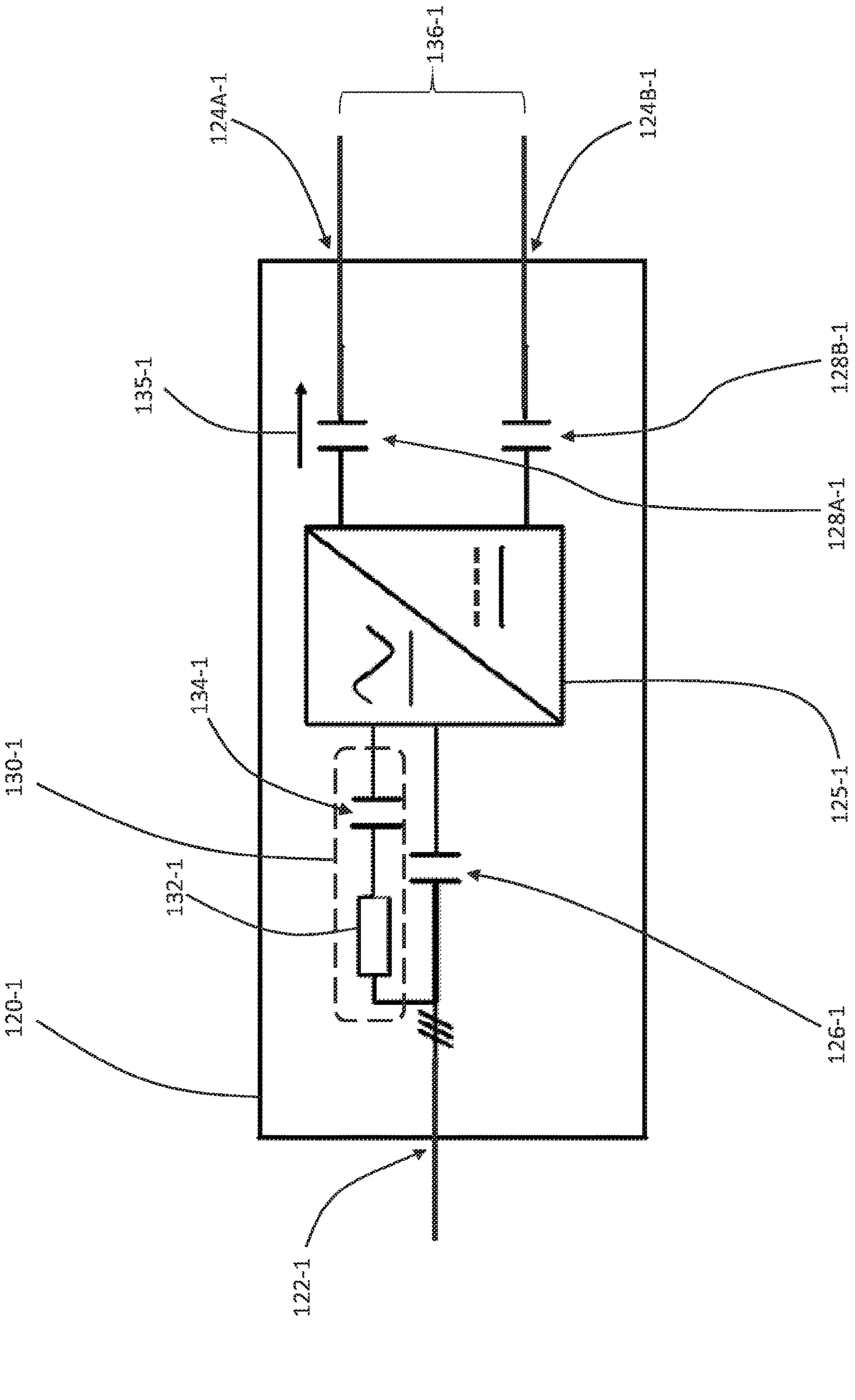
FIG. 2 depicts details related to each of the four inverter units depicted in FIG. 1 according to embodiments of the present disclosure.

Depicted in FIG. 2 is a diagram of example inverter 120-1. Inverter 120-1 includes a switch arrangement (for example, semiconductor power switch arrangement 125-1, which may include multiple switches, such as MOSFET or other similar transistors, and passive components such as inductors and capacitors for converting AC power to DC power), a main AC switch/contactor (for example, main AC switch/contactor 126-1), one or more main DC switches/contactors (for example, main DC switches/contactors 128A-1 and 128B-1), and an AC pre-charge circuit (for example, AC pre-charge circuit 130-1). The main AC contactor 126-1 and the main DC contactors 128A-1 and 128B-1 are used to connect/disconnect the inverter 120-1 to/from the AC source and the DC load, respectively. In this diagram, the current (Idc) flows in direction 135-1. The DC output voltage of the DC output 136-1 occurs between the two DC ports 124A-1 and 124B-1.

The AC pre-charge circuit 130-1 includes a resistor 132-1 and a pre-charge contactor (switch) 134-1. The pre-charge contactor 134-1 may extend across 2 or 3 poles of the main AC contactor 126-1. While either arrangement is capable of starting the inverters as power supplies, embodiments with the three phase arrangement has advantages in that the system can still be started with one leg of the pre-charge circuit faulty; however one drawback of the three phase arrangement is that the three phase arrangement draws more balanced current from the grid (although the operation of the pre-charge contactor 134-1 will typically be short lived, lasting only a few seconds, resulting in minimal power draw).

In at least one embodiment the remaining inverters (for example, inverters 120-2, 120-3 and 120-4) have the same features, and in some embodiments are identical to inverter 120-1. Moreover, while this discussion may assume a three-phase inverter, other embodiments utilize single-phase inverters while still other embodiments utilize split-phase inverters.

Figure 3:
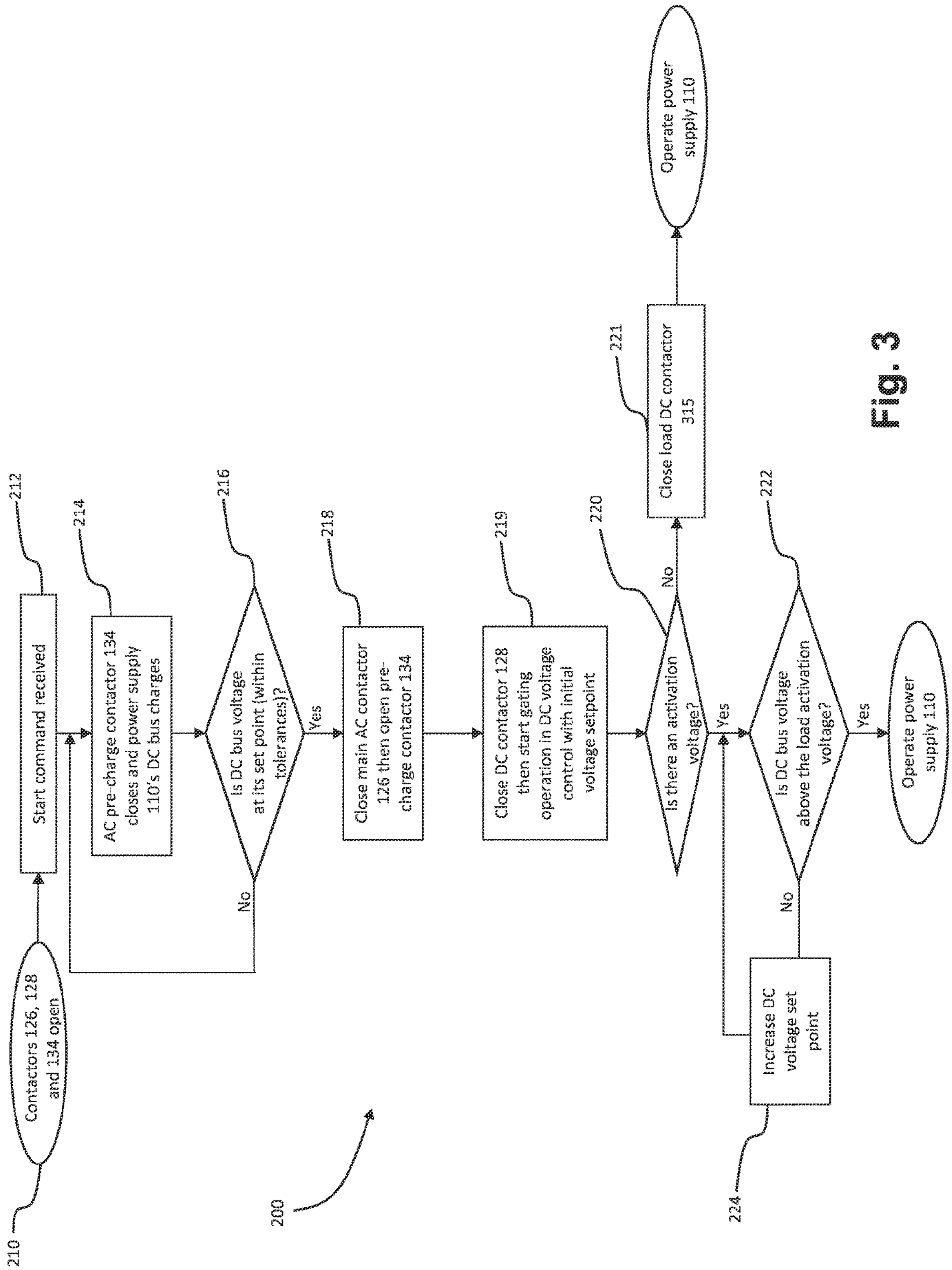
FIG. 3 depicts startup sequences for a power system according to embodiments of the present disclosure.

Depicted in FIG. 3 is a startup sequence 200 for the power supplies disclosed herein according to embodiments of the present disclosure. Power supply 110 will be used as a primary example, but other power supply embodiments as disclosed herein may be used unless stated otherwise.

When not in use, the power supply 110 is idle with its contactors (contactors 126, 128 and 134) typically being open as depicted in step 210. A start command 212 for the power supply 110 may be given from a local user interface, such as touch screen, or a remote interface (for example, being received through a remote interface from a higher level controller 119) using one of a variety of communication protocols. Once the start command 212 is received by the inverters 120 (such as being received from controller 116), each of the inverters 120 is pre-charged with the AC pre-charge contactor 134 closing and the power supply's 110 DC bus charging, as shown in step 214. More specifically, in step 214 each of the inverters 120 (inverters 120-1, 120-2, 120-3 and 120-4 in FIG. 1) closes its AC pre-charge contactor 134 (as depicted in FIG. 2, the pre-charge contactor 134 for inverter 120-1 is pre-charge contactor 134-1) and each of the inverter 120's internal DC buses (which for inverter 120-1 are located to the left of main DC contactors 128A-1 and 128B-1 in FIG. 2) charges. In some embodiments the internal DC buses of the inverters 120 include one or more capacitors.

In some embodiments of the present disclosure, inverters 120 utilize gate synchronization and/or zero sequence current control. While both of these features are beneficial, embodiments with zero sequence current control have the added benefit of ensuring that the sum of the currents is maintained at zero—the sum of the three-phase currents being the "zero sequence current."

Pre-charging 214 continues until the voltage on the DC bus for each inverter 120 is within a preset tolerance of the rectified mains AC voltage, which is the rectified AC voltage at the AC port 122 (which for inverter 120-1 is depicted in FIGS. 1 and 2 as AC port 122-1). The charging of each inverter 120 takes place through the pre-charge resistor 132 (which for inverter 120-1 is depicted in FIG. 2 as pre-charge resistor 132-1), the closed pre-charge contactor 134 (which for inverter 120-1 is depicted in FIG. 2 as pre-charge contactor 134-1), and the switches (for example, transistors) within the inverter module 120-1. As an example, for a mains input voltage of 600V line-line RMS, the DC bus would charge to approximately 850 VDC. An approximation that may be used with embodiments of the present disclosure is that the rectified voltage is 1.35 to 1.4 times the AC RMS voltage. Note that the main AC contactor 126 for each inverter 120 is open during AC pre-charging 214.

At step 216 a determination is made, such as by the controller 116 and/or controller 119, whether the charging of each of the inverters 120 is complete, which will occur when the DC bus voltage of each inverter is at its DC voltage set point. In some embodiments the DC voltage set point for each inverter equals the peak mains AC voltage. In some embodiments the determination of whether the DC bus voltage of each inverter 120 is at its set point is made by evaluating whether the DC bus voltage of each inverter 120 is within a predetermined threshold (for example, within 20V) of the peak mains AC voltage. When charging is determined to be complete (for example, the DC voltage of each inverter 120 is at its set point), which results in a "Yes" at step 216, the main AC contactor 126 (which for inverter 120-1 is depicted in FIG. 2 as main AC contactor 126-1) is closed as shown in step 218. Then, following the closing of the main AC contactor 126, the pre-charge contactor 134 (which for inverter 120-1 is depicted in FIG. 2 as main pre-charge contactor 134-1) is opened as also shown in step 218. Gating begins after the pre-charge contactor 134 is opened. In some embodiments the predetermined threshold for the DC bus voltage is ±5% of the rectified peak mains AC voltage (which typically avoids excessive current inrush), while in additional embodiments the predetermined threshold for the DC bus voltage is ±2.5% of the rectified peak mains AC voltage (which is typically sufficient to counter measurement errors).

The DC contactors 128 in each inverter 120 of power supply 110 will close and inverters 120 will then begin operating/gating (for example, operating in a DC voltage control mode) and control the DC bus voltage to an initial DC bus voltage set point as shown in step 219. This initial DC bus voltage set point may be received by controller 116 or from the higher-level controller 119 based on the needs of the application. It is noted that the higher level controller 119 (and/or the controller 116) may operate in a current control mode (for example, a DC current control mode) where the controller measures the current (and/or voltage) at the output 114 of the power system 110 and sends voltage commands (for example, set points) to the inverters 120 to achieve the desired current, while the inverters 120 operate in a voltage control mode to achieve the commanded voltage.

In some embodiments startup sequence 200 also includes a determination of whether there is a load activation voltage, such as depicted in FIG. 3 with optional step 220. A load activation voltage is a voltage above which the DC load (the load that is connected to the power supply 110 at the DC output 114) is activated and starts drawing power from the power supply 110. Below the load activation voltage, the power draw from such loads is minimal and substantially below the power rating (for example, less than 10% of the power rating) of a single inverter 120. In some embodiments the initial DC bus voltage set point for each inverter 120 in the power supply 110 is below the load activation voltage. Moreover, in some embodiments the load activation voltage and/or the DC bus voltage set point are sent to controller 116 from the higher level controller 119.

Step 220 can be in virtually any location in startup sequence 200, the precise location varying depending on the application. In some embodiments step 220 occurs before step 210. In still further embodiments the determination made in step 220 is preset into startup sequence 200 so that startup sequence 200 "assumes" the need to accommodate a load activation voltage, such as in embodiments where the user presets during installation whether or not power supply 110 is connected to an active load (a load that is active even when not receiving power from the power system 110, which is also referred to as a load that is "always active") and requires a minimum power supply voltage prior to the load connecting to the power supply.

Figure 4:
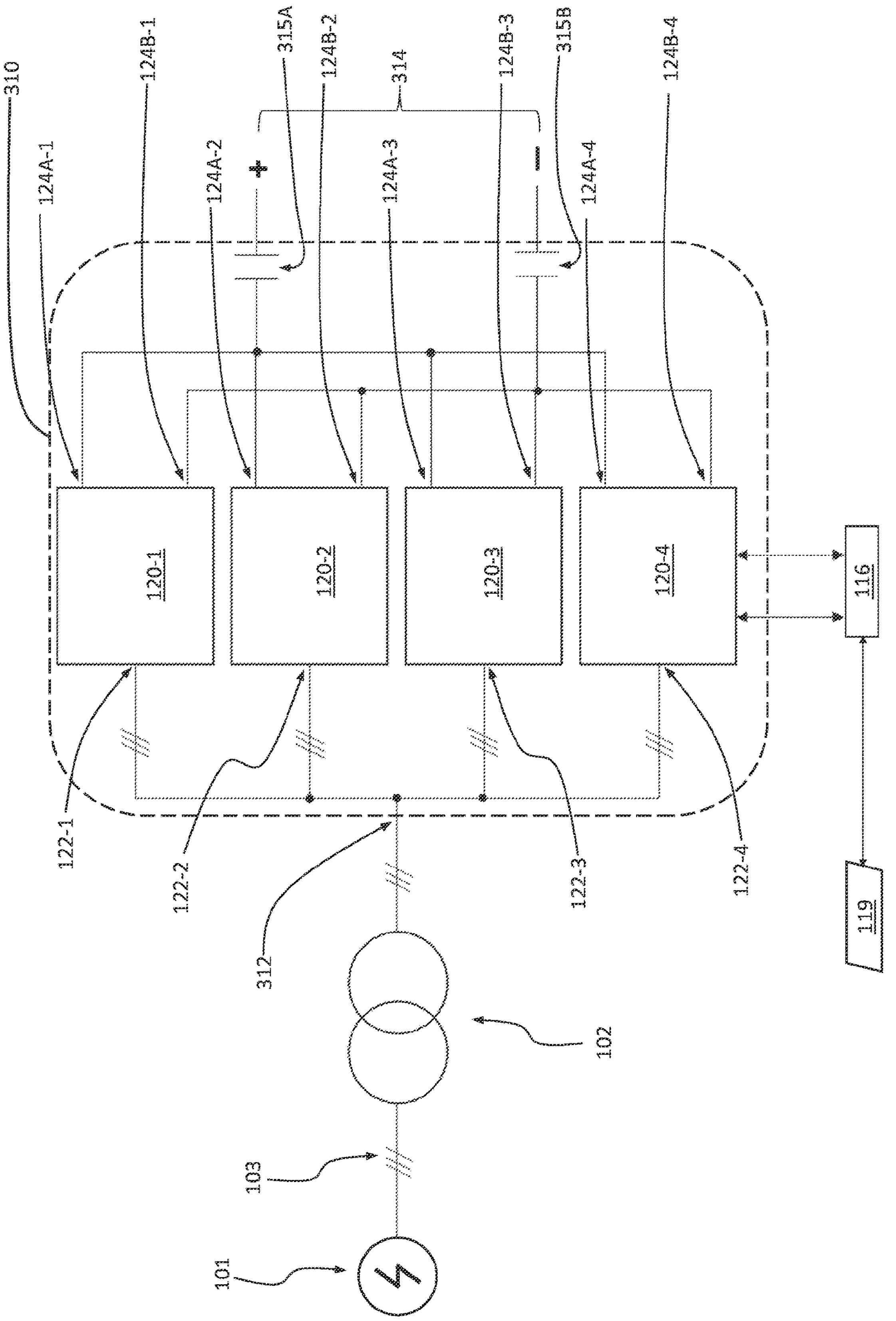
FIG. 4 depicts one or more power systems with four inverters connected together on AC and DC ports and usable with active loads according to embodiments of the present disclosure

In embodiments where there is no load activation voltage ("No" in step 220), and for which the example power system 310 in FIG. 4 may be utilized, the load DC contactor(s) 315 close connecting the load to the power supply 110 at step

221. The startup sequence 200 for this result of step 220 ends with power supply 110 operating normally and powering the load.

In embodiments where the load has a load activation voltage ("Yes" at step 220), and for which the example power system 110 in FIG. 1 may be utilized, the startup sequence 200 will determine at step 222 whether the DC bus voltage of the power supply 110 is above the load activation voltage. If the DC bus voltage is not above the load activation voltage ("No" at step 222), the main DC contactors 128 internal to inverter 120-1 (main DC contactors 128A-1 and 128B-1) will remain closed and the DC voltage set point will be increased at step 224. Steps 222 and 224 will iterate/loop until the DC bus voltage is above the load activation voltage.

When the DC bus voltage of the power supply 110 is above the load activation voltage ("Yes" at step 222), pre-charge contactors 134 are commanded open, the main AC contactor 126 is commanded closed, and the main DC contactors 128 within inverter 120 are commanded to remain closed, resulting in the DC load being connected to and powered by the power supply 110. The startup sequence 200 for "Yes" results at steps 220 and 222 ends with power supply 110 operating normally and powering the load.

Example DC loads that power supply 110 is suited to provide power include hydrogen generation applications where the power supply 110 may be connected to a hydrogen electrolyzer and the DC load may be referred to as the electrolyzer load. For loads that do not have such activation characteristics (for example, loads that do not require a load activation voltage, such as active DC loads), embodiments such as the embodiments represented by FIG. 4 can be used.

In some embodiments each inverter 120 is programmed to apply droop characteristics to its output DC voltage control scheme, such as what is represented by the discussion involving Equations 1 and 2, which can have advantages in allowing the inverters 120 to share power. These droop characteristics are applied during the startup sequences disclosed herein where the DC bus voltage set point of each inverter 120 is adjusted from an initial set point to a final set point based on commands received from the controller 116 (and/or the higher level controller 119) and the inverter 120's own measurement of its output current (and/or output power).

The utilization of droop characteristics as disclosed herein utilizes power supply 110 as a primary example, but the other power supply embodiments as disclosed herein may also utilize similar droop characteristics unless stated otherwise.

For a current-based droop, the droop characteristic is:

$$V_{DCSP} = V_{DCSP,HLC} - (k_I * I_{DC}). \qquad \text{Equation 1}$$

where $V_{DCSP}$ is the inverter 120's internal DC bus voltage set point, $V_{DCSP,HLC}$ is the set point set by the controller 116 and/or the higher level controller 119, $k_I$ is the voltage-current droop slope, and $I_{DC}$ is the inverter's measured output DC current.

For power-based droop, the droop characteristic is:

$$V_{DCSP} = V_{DCSP,HLC} - (k_P * I_{DC} * V_{DC}). \qquad \text{Equation 2}$$

where $V_{DCSP}$, $V_{DCSP,HLC}$ and $I_{DC}$ are defined above in relation to Equation 1, $k_P$ is the voltage-power droop slope, $V_{DC}$ is the measured output DC voltage, and $I_{DC}*V_{DC}$ is the calculated output DC power of the inverter 120.

These droop characteristics can have the effect of decreasing the inverter 120's internal DC bus voltage set point when current is flowing out of the inverter 120's DC output 114 and increasing the inverter 120's set point when current is flowing into the inverter 120's DC output 114.

In embodiments of the present disclosure, the slopes $k_I$ and $k_P$ are selected to minimize the output voltage variation between the inverters 120 (for example, inverters 120-1, 120-2, 120-3 and 120-4 in FIG. 1) under changing load conditions while allowing adequate load sharing between the inverters 120. In example embodiments the values of $k_I$ and $k_P$ are selected to be approximately 5% of the rated current, which for an example 1000 V and 1000 A power supply, the output voltage would drop by 50 V when 1000 A is flowing. The values of $k_I$ and $k_P$ may then be further adjusted based on empirical data of the specific power system.

The slopes $k_I$ and $k_P$ may be set at or before the time the power system is installed and connected to the load, and if appropriately set may not require adjustment at a later time. As an example, for an application where the internal DC bus voltage set point ($V_{DCSP}$) of each inverter 120 is 1000V and the inverter 120's output DC current rating ($I_{DC}$) is 1000 A, a voltage-current droop slope of $k_I$=0.01 (V/A) would be suitable and could be used in some embodiments. In some embodiments, $$k_I = 5\% * \frac{V_{DCSP}}{I_{DCSP}},$$

where $V_{DCSP}$ is nominal power supply output voltage and $I_{RATED}$ is the rated output current. Using Equation 1:

$$V_{DCSP} = 1000\text{ V} - \left(0.01\frac{\text{V}}{\text{A}} * 1000\text{ A}\right) = 1000\text{ V} - 10\text{ V} = 990\text{ V}.$$

This voltage-current droop slope will cause the output voltage of the power supply 110 to change by 10V when the power supply 110 is supplying a full load current (full rated power) as compared to when the power supply 110 is in an unloaded condition. For the same inverter 120, a voltage-power droop slope of $k_P$=0.00001 may also be used, which will result in an output voltage drop of the same amount (10V) when supplying full rated power to the load. Using Equation 2:

$$V_{DCSP} = 1000\text{ V} - \left(0.00001\frac{\text{V}}{\text{A}} * 1000\text{ A} * 1000\text{ V}\right) = 1000\text{ V} - 10\text{ V} = 990\text{ V}.$$

Once the higher level controller 119 (and/or controller 116) has determined that all of the inverters 120 are operating in DC voltage control mode (which may include determining that all of the inverters are at their initial set point, which may be below the final set point for powering the load) and also gating in some embodiments, the higher level controller 119 (and/or controller 116) can increase the set point (for example, $V_{DCSP,HLC}$) until the set point is above the load activation voltage. The higher level controller 119 (and/or controller 116) may also ramp up (iteratively increase) the set point from an initial set point value to a final set point value at a rate that is sufficiently slow to prevent the inverters 120 from circulating too much current amongst themselves. For example, if the higher level controller is sending voltage updates every 100 ms and it is desired to limit the current flow level between the inverters to be under 10% of rated current, the following can determine the ramp rate to apply. Due to differences in communication times to the individual inverters, say inverter 120-1 receives a set point of $V_{DCSP}$ and inverter 120-2 receives a set point of $V_{DCSP}$+dV, where dV is the voltage increment that the higher level controller 119 applies each 100 ms. Since the inverters are paralleled on their DC outputs, the following applies $V_{DCSP1}-k_I*I_{DC}=V_{DCSP1}+dV-k_I*(-I_{DC})$. Note the sign of $I_{DC}$ is different on either side since current is flowing from one inverter to another. This means that $I_{DC}=dV/(2*k_I)$. For $I_{DC}$ to be under 10% of rated current, $dV=10\%*I_{rated}*2*k_I$. For $I_{rated}$=1000 A and $k_I$=0.01 V/A, dV=2V. So in the example embodiment the higher level controller will limit the ramp rate to 2V/100 ms or 20V/s.

When an inverter 120's set point is different from another inverter 120 in power system 110 (for example, when inverter 120-1's set point is different from inverter 120-2's set point), which can occur due to latencies in commands communicated to the inverters, power can circulate between the two inverters, which results in the power load being transferred between the inverters, which increases losses and can result in excessive heating. As an example, if both inverter 120-1 and 120-2 have $k_I$=0.01, inverter 120-1 has an existing set point of (and is operating at) 1000 V, and inverter 120-2 has an existing set point of (and is operating at) 1002 V, the following will apply:

$$1000\text{ V}-\left(0.01\frac{\text{V}}{\text{A}}*I_{DC1}\right)=1002\text{ V}-\left(0.01\frac{\text{V}}{\text{A}}*I_{DC2}\right),$$

which leads to $$I_{DC2}-I_{DC1}=200\text{ A}.$$

In this example, 100 A of current can potentially circulate between inverter 120-1 and inverter 120-2.

A difference in operational voltage of inverters 120-1 and 120-2 can be caused by time delays between the commands being sent by higher level controller 119 (or controller 116) and/or received by inverters 120-1 and 120-2. Moreover, even if the commands from the higher level controller 119 (or controller 116) to the inverters 120-1 and 120-2 are sent simultaneously, the rate at which the inverters increase power may be different, resulting in the same issues.

In some embodiments the commands from the higher level controller 119 to the individual inverters 120 are sent sequentially with a set time period between the commands. For example, inverter 120-1 can receive a command first and inverter 120-2 can receive a command later, for example, 100 milliseconds (ms) later. The result is that inverter 120-1 will be 100 ms ahead of inverter 120-2 in reaching the commanded set point, resulting in inverter 120-1 being at a different voltage than inverter 120-2. To limit the voltage differences between the individual inverters 120, the higher level controller 119 (and/or controller 116) may limit the amount of change in the set point applied to each command iteration. In at least one embodiment the change in the set point is limited to, for example, 0.1 V per sequential commands. By limiting the ramp rate of commanded set points for the inverters 120, the voltage differences between the inverters 120 can be controlled as the inverters 120 in power supply 110 are ramped up to the required voltage. This in turn limits the differences between the set points (and the operational states) of individual inverters 120 at any given time, which in turn limits the circulation of current between the individual inverters 120. This ramping may alternately be implemented within the inverters themselves, such as in embodiments where the higher level controller sends a final set point without sending a ramping rate.

Once the set points of inverters 120 reach the load activation voltage (and the load is electrically connected to the power supply 110 in embodiments where the load is not always active, such as embodiments represented by FIG. 3), the load begins drawing power from the inverters 120 in the power supply 110. The droop control helps ensure that power drawn from power supply 110 is shared between the inverters 120 in ratio of their programmed slopes. In embodiments that include two or more inverters 120 that have dissimilar power ratings, the k values set for each inverter may be different to distribute power (potentially unevenly) between the inverters with dissimilar power ratings.

When shutting off the power supply 110 in some embodiments, the higher level controller 119 (and/or controller 116) lowers the voltage set point for each inverter 120 to a voltage that is lower than the load activation voltage. Once the inverters 120 reach a voltage that is lower than the load activation voltage, the contactors 315 (or contactors internal to the inverters if applicable) disconnect the load from power supply 110 and the inverters 120 are unloaded. The higher level controller 119 (and/or controller 116) may then send a stop command to each inverter 120 resulting in the inverters 120 discharging their voltage by, for example, bleeder resistors connected across the output capacitors that discharge the capacitors.

FIG. 4 is a depiction of a power supply 310 useful in situations where the loads are always active according to embodiments of the present disclosure. Here, the load does not have a load activation voltage and will immediately begin drawing power when connected to the power supply. Power supply 310 is connected to an electrical grid 101, and may be connected to the electrical grid 101 by a transformer (for example, a stepdown transformer 102). Embodiments of power supply 310 include two or more inverters 120 (for example, four inverters 120-1, 120-2, 120-3 and 120-4) paralleled on their AC ports 122 (for example, AC ports 122-1, 122-2, 122-3 and 122-4) and paralleled on their DC ports 124A and 124B (for example, DC ports 124A-1, 124B-1, 124A-2, 124B-2, 124A-3, 124B-3, 124A-4 and 124B-4). As stated earlier, the inverters 120 may have internal switches/contactors that can connect and disconnect each inverter 120 from the inverter's AC input and/or the inverter's DC output. As with power supply 110, by having the multiple inverters 120 connected together in this manner, a higher power rating for the power supply 310 can be achieved. In one example embodiment represented by FIG. 4, each of the inverters 120 in power supply 310 are 1.5 megawatt (MW) inverters paralleled together to create a 6 MW power supply 310. Power supply 310 includes main contactors (for example, power supply output contactors 315A and 315B) between the paralleled output DC ports of the inverters 120 and the load connection (shown as DC output 314).

When the power supply 310 is started, one or both of contactors 315A and 315B are kept open to isolate the load from the power supply 310. The individual inverters 120 are started as described above with respect to FIGS. 1-3. The same control scheme using droop as described above may also be employed. Once all of the inverters 120 are online and the DC voltage is being regulated to the set point commanded by the higher level controller 119 (and/or controller 116), the inverters 120 will then be operating in a no-load condition since the contactors 315A and 315B will be open. The contactors 315A and 315B will then be closed and the load will be connected to the power supply 310, at which time the inverters 120 will begin sharing the load and optionally operating using the droop control scheme described above. Control of the contactors 315A and 315B may reside with an internal controller in inverter 120, the higher level controller 119 or the controller 116. When contactors 315A and 315B are closed, the DC voltage is applied to the load and it starts drawing power from the power supply.

When the power being supplied to the load is to be stopped, contactors 315A and 315B are opened and the inverters 120 (inverters 120-1, 120-2, 120-3 and 120-4 in FIG. 4) are sent stop commands.

The presence of contactors 315A and 315B in power supply 310 provides the ability to simplify the inverters 120 themselves in some embodiments, such as by removing the main DC contactors 128A and 128B from inverters 120 since the contactors 315A and 315B are capable of connecting and disconnecting power supply 310's DC output to and from the load.

Figure 5:
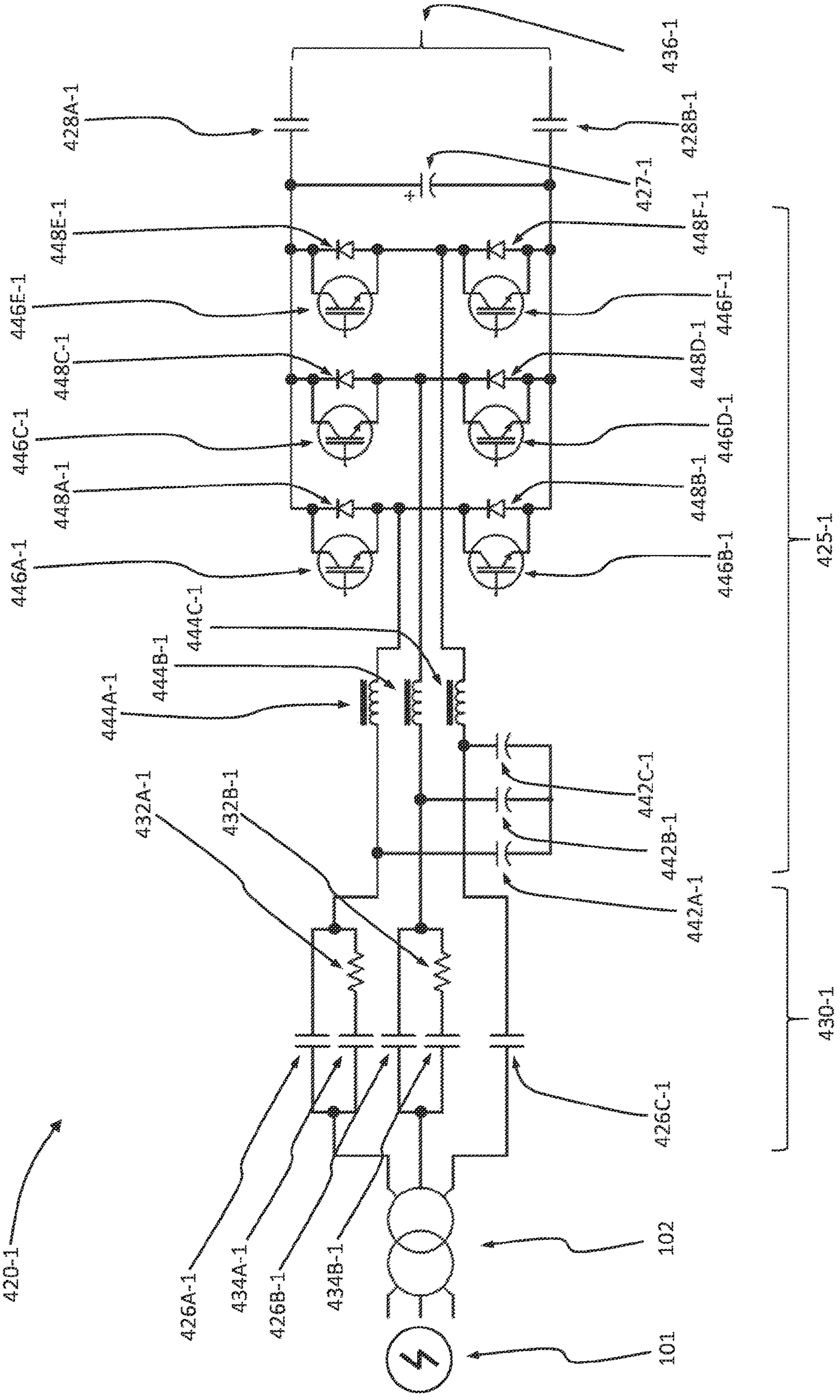
FIG. 5 depicts a schematic of an inverter with optional features used in power systems according to embodiments of the present disclosure.

FIG. 5 depicts an example inverter 420-1, which is paralleled together with at least one additional inverter of similar topology as described above in relation to FIGS. 1-3 to form a power supply according to at least one embodiment of the present disclosure. Inverter 420-1 may be referred to as a two level inverter since it is able to generate two levels (positive DC or negative DC) at the inverter module output terminals. Inverter 420-1 includes AC pre-charge circuitry 430-1 and switching/gating array 425-1. Inverter 420-1 may be connected to a three-phase power grid 101, and may be connected to grid 101 by a transformer (for example, stepdown transformer 102).

The pre-charge circuitry 430-1 includes three main AC contactors 426 (namely, AC contactors 426A-1, 426B-1 and 426C-1), one for each phase of the AC power being received from the grid 101. Two of the AC contactors 426 (namely, AC contactors 426A-1 and 426B-1 in FIG. 5) are each paralleled with a pre-charge contactor 434 (namely, pre-charge contactors 434A-1 and 434B-1 in FIG. 5) and an optional resistor 432 (namely, resistors 432A-1 and 432B-1 in FIG. 5), while one of the AC contactors 426 (namely, AC contactor 426C-1) is not. The three phases may also be connected together with capacitors (such as capacitors 442A-1, 442B-1 and 442C-1 in FIG. 5), and each of the three phases may include an inductor (such as inductors 444A-1, 444B-1 and 444C-1).

The switching arrangement 425 includes six switches, each with a transistor 446 and a diode 448. For example, the switching arrangement 425-1 in FIG. 5 includes the following switches: (1) transistor 446A-1 & diode 448A-1, (2) transistor 446B-1 & diode 448B-1, (3) transistor 446C-1 & diode 448C-1, (4) transistor 446D-1 & diode 448D-1, (5) transistor 446E-1 & diode 448E-1, and (6) transistor 446F-1 & diode 448F-1. These six switches are arranged in a configuration shown in FIG. 5.

The DC output 436-1 of the switching arrangement 425-1 of inverter 420-1 may be bridged by a capacitor (for example, capacitor 427-1) and may include one or more DC output contactors (for example, DC output contactor 428A-1 and/or DC output contactor 428B-1).

FIG. 5 depicts an example inverter 420 (specifically, inverter 420-1) according to embodiments of the present disclosure. Inverter 420-1 is connected to a grid 101 via a transformer (for example, a stepdown transformer 102, which may step the voltage of the grid 101 down to, for example, 600 Vac) and includes an AC pre-charge circuit 430-1 and a power switch arrangement 425-1, which may include a filter circuit with one or more capacitors (for example, capacitors 442A-1, 442B-1 and 442C-1) and one or more inductors (for example, inductors 444A-1, 444B-1 and 444C-1). Power switch arrangement 425-1 includes a plurality of transistors 446 and diodes 448 (for example, transistors 446A-1, 446B-1, 446C-1, 446D-1, 446E-1 and 446F-1, and diodes 448A-1, 448B-1, 448C-1, 448D-1, 448E-1 and 448F-1) configured and adapted to convert the AC current into DC current.

The power switch arrangement 425-1 includes a DC output 436-1 with an optional capacitor 427-1 and one or more contactors 428 (for example, contactors 428A-1 and/or 428B-1).

The AC pre-charge circuit 430-1 includes a pre-charge contactor 434-1 and a pre-charge resistor 432-1 paralleled with a main AC contactor 426-1 on one or more of the three electrical pathways. For example, in FIG. 5 there is a pre-charge contactor 434A-1 and a resistor 432A-1 paralleled with main AC contactor 426A-1 on the upper pathway in the diagram. As another example, there is a pre-charge contactor 434B-1 and a resistor 432B-1 paralleled with main AC contactor 426B-1 on the middle pathway in the diagram of FIG. 5. However, there is only a main AC contactor 426C-1 on the lowest pathway in the diagram of FIG. 5.

The start-up of power system 410 proceeds according to procedures outlined in relation to FIG. 3 and its description above.

Figure 6:
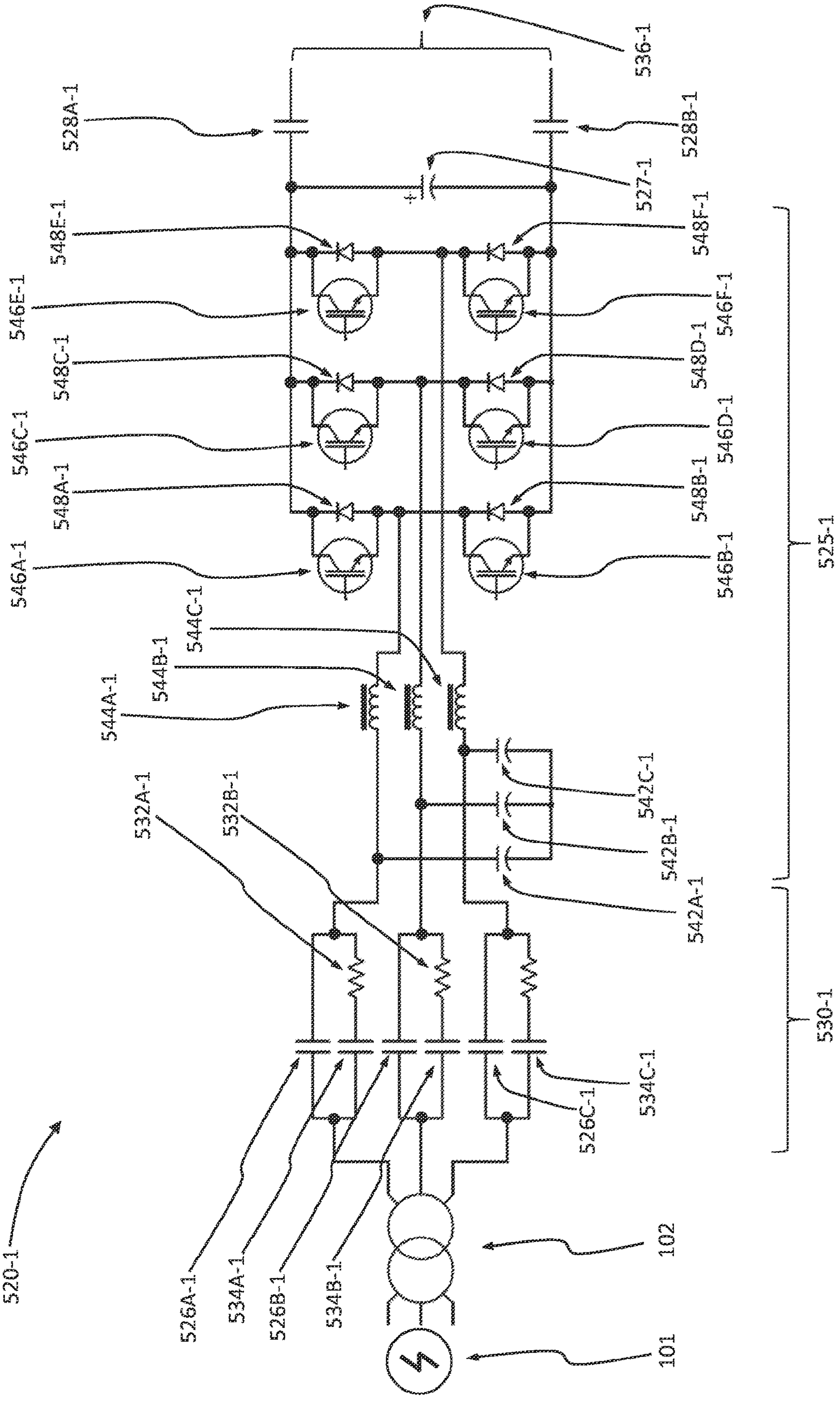
FIG. 6 depicts a schematic of an inverter with optional features used in power systems according to additional embodiments of the present disclosure.

FIG. 6 depicts an example inverter 520 (specifically, inverter 520-1) according to embodiments of the present disclosure. Inverter 520-1 is connected to a grid 101 via a transformer (for example, a stepdown transformer 102, which may step the voltage of the grid 101 down to, for example, 600 Vac) and includes an AC pre-charge circuit 530-1 and a power switch arrangement 525-1, which may include a filter circuit with one or more capacitors (for example, capacitors 542A-1, 542B-1 and 542C-1) and one or more inductors (for example, inductors 544A-1, 544B-1 and 544C-1). Power switch arrangement 525-1 includes a plurality of transistors 546 and diodes 548 (for example, transistors 546A-1, 546B-1, 546C-1, 546D-1, 546E-1 and 546F-1, and diodes 548A-1, 548B-1, 548C-1, 548D-1, 548E-1 and 548F-1) configured and adapted to convert the AC current into DC current.

The power switch arrangement 525-1 includes a DC output 536-1 with an optional capacitor 527-1 and one or more contactors 528 (for example, contactors 528A-1 and/or 528B-1).

The AC pre-charge circuit 530-1 includes a pre-charge contactor 534-1 and a pre-charge resistor 532-1 paralleled with a main AC contactor 526-1 on the three electrical pathways. For example, in FIG. 6 there is: a pre-charge contactor 534A-1 and a resistor 532A-1 paralleled with main AC contactor 526A-1 on the upper line in the diagram; a pre-charge contactor 534B-1 and a resistor 532B-1 paralleled with main AC contactor 526B-1 on the middle pathway; and a pre-charge contactor 534C-1 and a resistor 532C-1 paralleled with main AC contactor 526C-1 on the lower pathway.

The start-up of power system 510 proceeds according to procedures outlined in relation to FIG. 3 and its description above.

Figure 7:
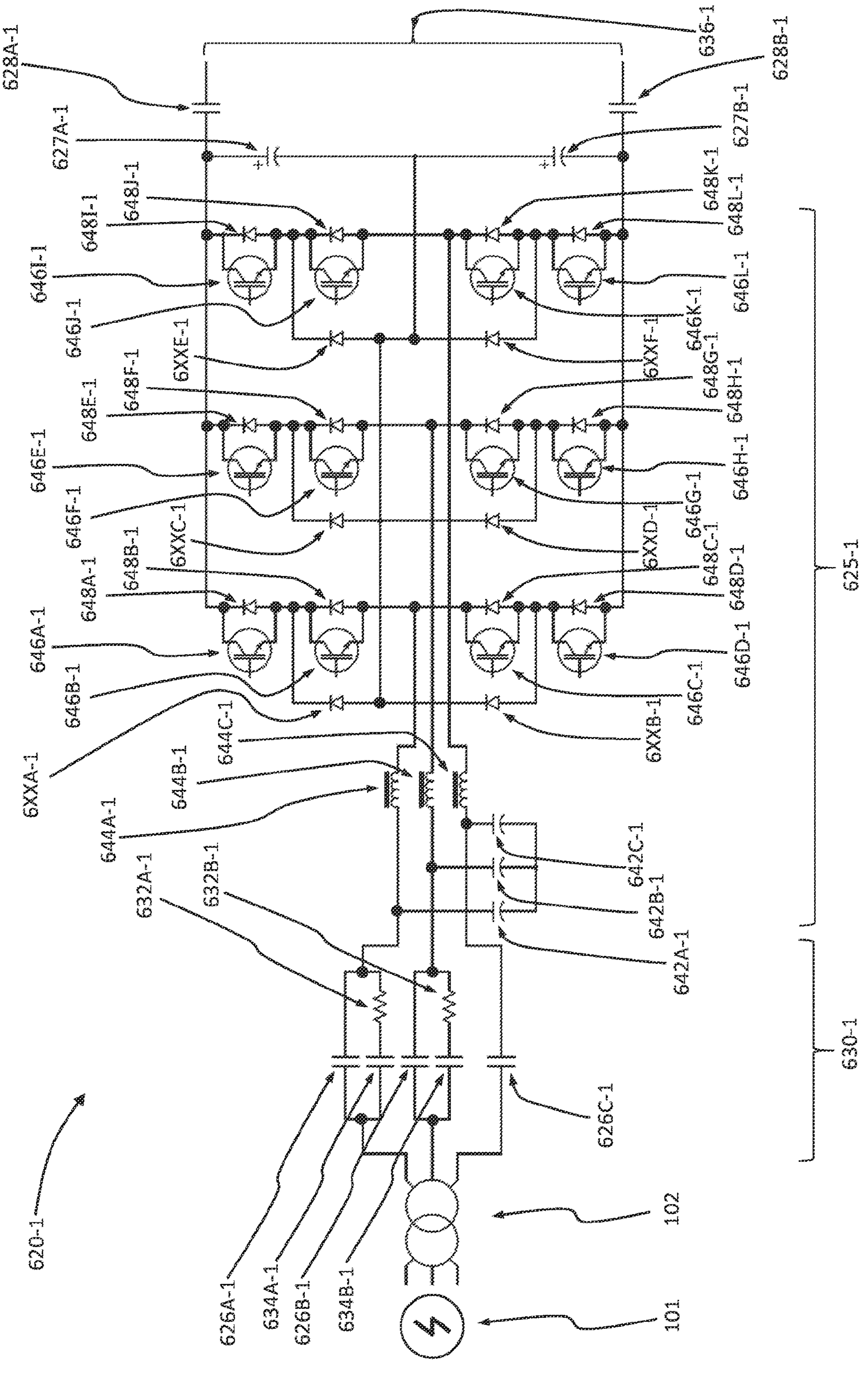
FIG. 7 depicts a schematic of an inverter with optional features used in power systems according to further embodiments of the present disclosure.

FIG. 7 depicts an example inverter 620 (namely, inverter 620-1) according to embodiments of the present disclosure. Inverter 620-1 is connected to a grid 101 via a transformer (for example, a stepdown transformer 102, which may step the voltage of the grid 101 down to, for example, 600 Vac) and includes an AC pre-charge circuit 630-1 and a power switch arrangement 625-1, which may include a filter circuit with one or more capacitors (for example, capacitors 642A-1, 642B-1 and 642C-1) and one or more inductors (for example, inductors 644A-1, 644B-1 and 644C-1). Power switch arrangement 625-1 includes a plurality of transistors 646 and diodes 648 (for example, transistors 646A-1, 646B-1, 646C-1, 646D-1, 646E-1, 646F-1, 646G-1, 646H-1, 6461-1, 646J-1, 646K-1 and 646L-1, and diodes 648A-1, 648B-1, 648C-1, 648D-1, 648E-1, 648F-1, 648G-1, 648H-1, 648I-1, 648J-1, 648K-1 and 648L-1) configured and adapted to convert the AC current into DC current.

The power switch arrangement 625-1 includes a DC output 636-1 with an optional one or more capacitors (for example, capacitor 627A-1 and/or capacitor 627B-1) and one or more contactors 628 (for example, contactors 628A-1 and 628B-1).

The AC pre-charge circuit 630-1 includes a pre-charge contactor 634-1 and a pre-charge resistor 632-1 paralleled with a main AC contactor 626-1 on one or more of the three electrical pathways. For example, in FIG. 7 there is a pre-charge contactor 634A-1 and a resistor 632A-1 paralleled with a main AC contactor 626A-1 on the upper pathway in the diagram. As another example, there is a pre-charge contactor 634B-1 and a resistor 632B-1 paralleled with main AC contactor 626B-1 on the middle pathway in the diagram of FIG. 7. However, there is only a main AC contactor 626C-1 on the lowest line in the diagram of FIG. 7.

The start-up of power system 710 proceeds according to procedures outlined in relation to FIG. 3 and its description above.

Figure 8:
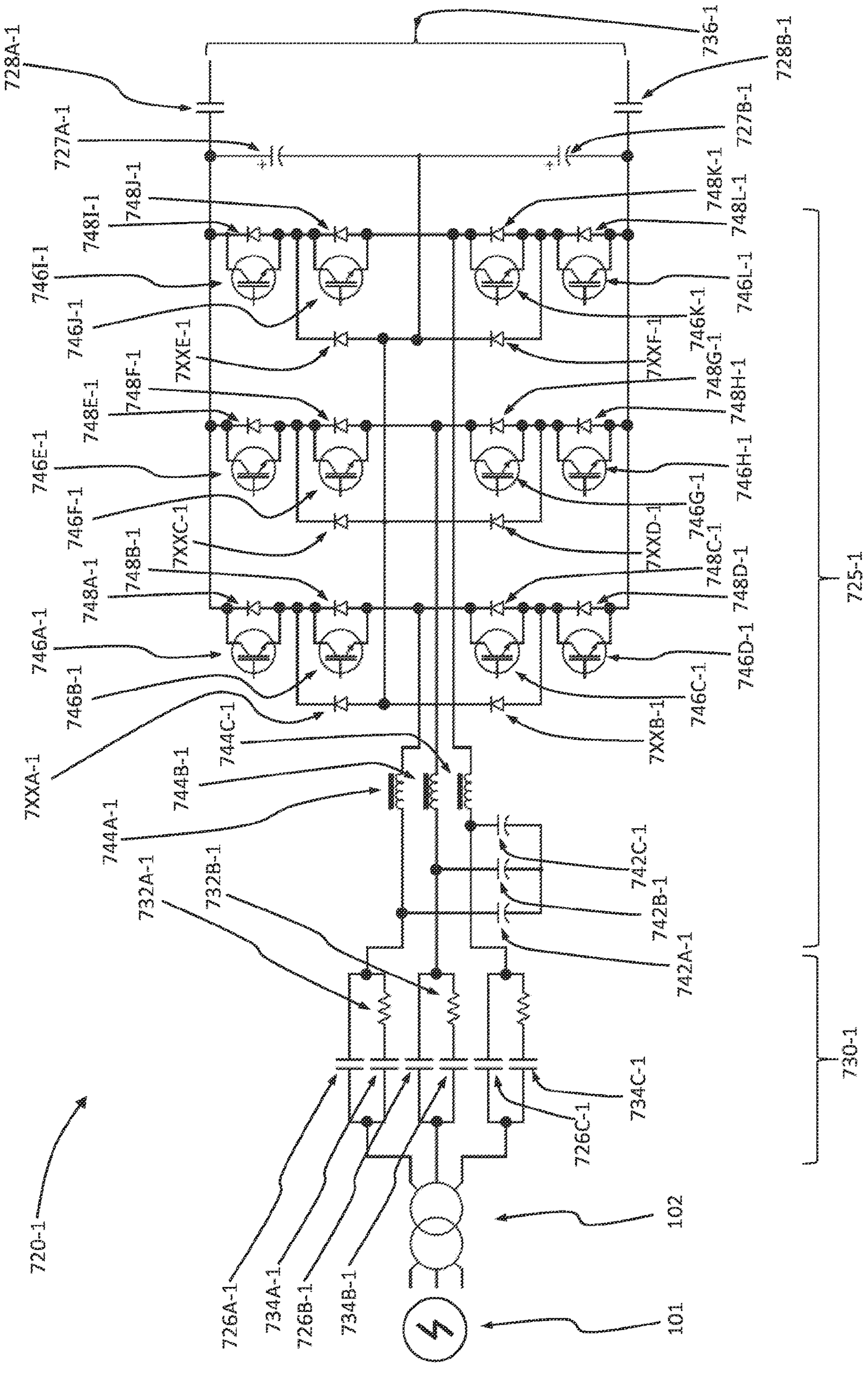
FIG. 8 depicts a schematic of an inverter with optional features used in power systems according to still further embodiments of the present disclosure.

FIG. 8 depicts an example inverter 720 (namely, inverter 720-1) according to embodiments of the present disclosure. Inverter 720-1 is connected to a grid 101 via a transformer (for example, a stepdown transformer 102, which may step the voltage of the grid 101 down to, for example, 600 Vac) and includes an AC pre-charge circuit 730-1 and a power switch arrangement 725-1, which may include a filter circuit with one or more capacitors (for example, capacitors 742A-1, 742B-1 and 742C-1) and one or more inductors (for example, inductors 744A-1, 744B-1 and 744C-1). Power switch arrangement 725-1 includes a plurality of transistors 746 and diodes 748 (for example, transistors 746A-1, 746B-1, 746C-1, 746D-1, 746E-1, 746F-1, 746G-1, 746H-1, 746I-1, 746J-1, 746K-1 and 746L-1, and diodes 748A-1, 748B-1, 748C-1, 748D-1, 748E-1, 748F-1, 748G-1, 748H-1, 748I-1, 748J-1, 748K-1 and 748L-1) configured and adapted to convert the AC current into DC current.

The power switch arrangement 725-1 includes a DC output 736-1 with an optional one or more capacitors (for example, capacitor 727A-1 and/or capacitor 727B-1) and one or more contactors 728 (for example, contactors 728A-1 and 728B-1).

The AC pre-charge circuit 730-1 includes a pre-charge contactor 734-1 and a pre-charge resistor 732-1 paralleled with a main AC contactor 726-1 on the three electrical pathways. For example, in FIG. 8 there is depicted: a pre-charge contactor 734A-1 and a resistor 732A-1 paralleled with a main AC contactor 726A-1 on the upper pathway in the diagram; a pre-charge contactor 734B-1 and a resistor 732B-1 paralleled with a main AC contactor 726B-1 on the middle pathway; and a pre-charge contactor 734C-1 and a resistor 732C-1 paralleled with main AC contactor 726C-1 on the lower line.

The start-up of power system 710 proceeds according to procedures outlined in relation to FIG. 3 and its description above.

Figure 9B:
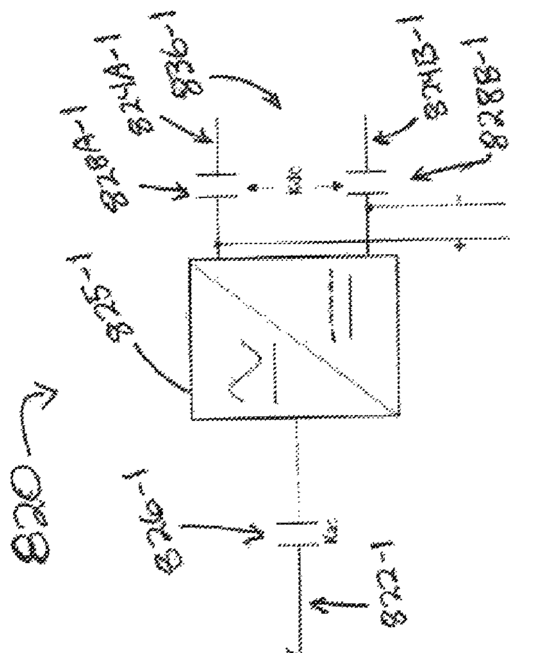
FIG. 9B is an expanded view of one of the inverters in FIG. 9A and its connection to FIG. 10 depicts startup sequences for a power system according to embodiments of the present disclosure.
Figure 9A:
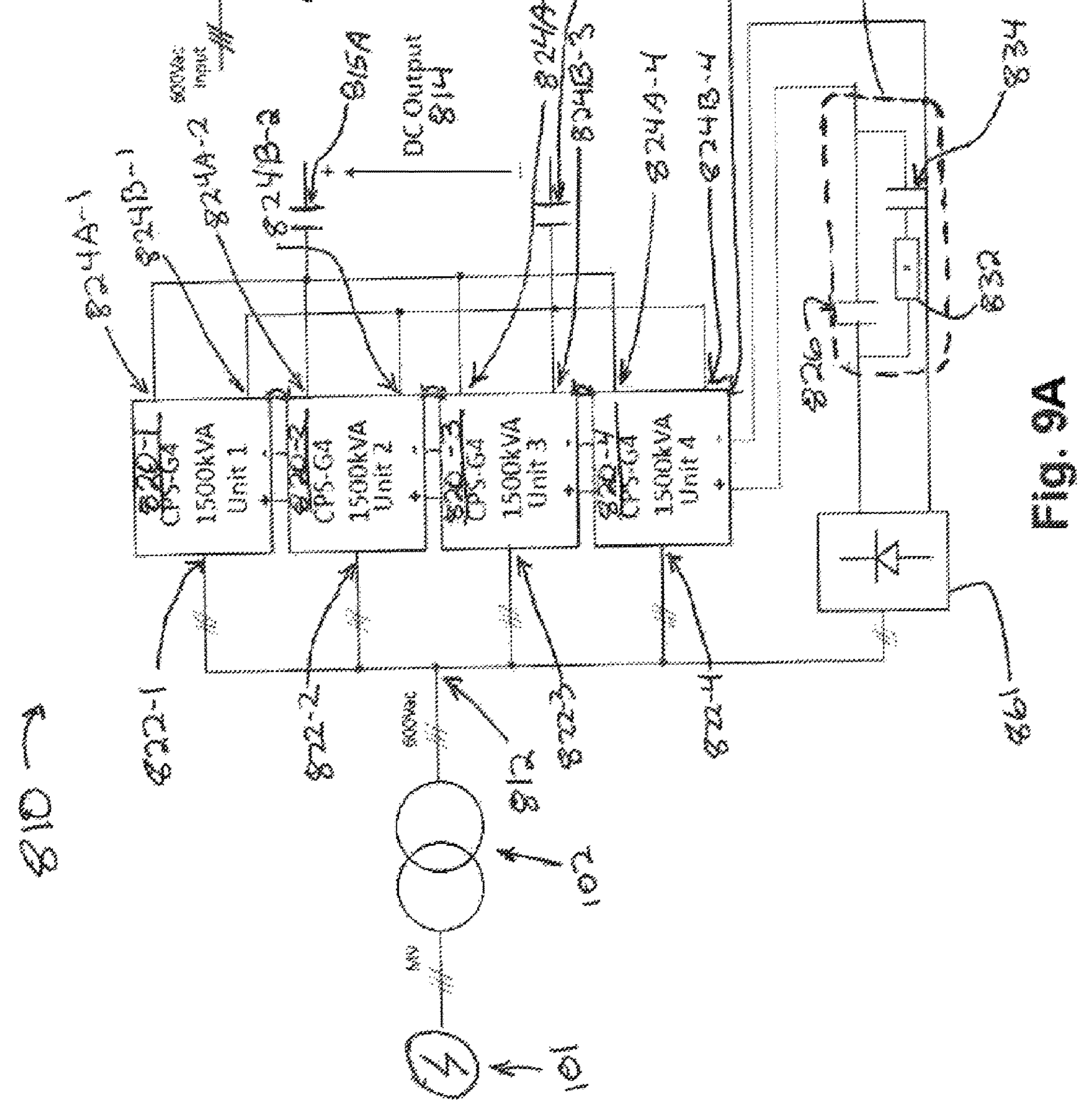
FIG. 9A depicts one or more power systems with four inverters connected together on AC and DC ports according to embodiments of the present disclosure.

Depicted in FIG. 9A is a diagram of a power supply 810 with an AC input 812 and a DC output 814. The AC input 812 of power supply 810 may be connected to an electrical grid 101, which may be a 3-phase grid (as denoted by the "///" symbol) and/or may be a medium voltage grid. Power supply 810 may also be connected to grid 101 via a transformer (for example, a stepdown transformer 102, which may step the voltage of the grid 101 down to, for example, 600 Vac).

The power supply 810 includes two or more inverters 820 (for example, four inverters 820-1, 820-2, 820-3 and 820-4) that are connected together to share the load. Example embodiments of power supply 810 include two or more inverters 820 that are paralleled on their AC ports 822 (for example, AC ports 822-1, 822-2, 822-3 and 822-4) and paralleled on their DC ports 824A and 824B (for example, DC ports 824A-1, 824B-1, 824A-2, 824B-2, 824A-3, 824B-3, 824A-4 and 824B-4). By having the multiple inverters 820 connected together in this manner, a higher power rating for the power supply 810 can be achieved. The four inverters 820-1, 820-2, 820-3 and 820-4 may have internal switches/contactors that can connect and disconnect each inverter 820 from the inverter's AC input and/or the inverter's DC output.

The four inverters 820-1, 820-2, 820-3 and 820-4 may also be connected to a controller 116, such as via a controller area network (CAN) bus. The CAN bus interface may be used to send start/stop commands and voltage set points to the inverters 810. Interfacing directly between the inverters 810 can be used for synchronization of gating, and in some embodiments one inverter 810 can act as a master and the other inverter(s) can act as slaves, wherein the master sends a repetitive pulses that are synchronized with its own switching and the slaves use this pulse to generate their switching patterns resulting in the slaves being synchronized to the master.

In one example embodiment represented by FIG. 9A, each of the four inverters 820 are 1.5 megawatt (MW) inverters paralleled together to create a 6 MW power supply 810. In some embodiments each inverter 820 includes an internal controller that controls the components of inverter 820, and communicates with and receives commands from controller 116.

Embodiments depicted by FIG. 9A are usable with loads with a load activation voltage and do not begin to draw power from their power source (for example, power source 810) until a minimum voltage is reached. For example, loads that perform electrolysis (for example, hydrogen electrolyzers) may not begin drawing current from their power source until the power source presents a minimum voltage (or current) to the load (such as a minimum voltage for the electrolysis process to begin) even when the load is continually connected to the power source. As another example, some loads include an internal switch that will not allow the load to draw power from a power source until the power source has reached a minimum voltage (or current).

Depicted in FIG. 9B is a diagram of example inverter 820-1. Inverter 820-1 includes a switch arrangement (for example, semiconductor power switch arrangement 825-1, which may include multiple switches, such as MOSFET or other similar transistors, and passive components such as inductors and capacitors for converting AC power to DC power), a main switch/contactor (for example, main switch/contactor 826), one or more main DC switches/contactors (for example, main DC switches/contactors 828A-1 and 828B-1), and a pre-charge circuit (for example, pre-charge circuit 830). The main contactor 826 and the main DC contactors 828A-1 and 828B-1 are used to connect/disconnect the inverter 820-1 to/from the AC source and the DC load, respectively. The DC output voltage of the DC output 836-1 occurs between the two DC ports 824A-1 and 824B-1.

A rectifier 861 (for example, rectifier 861) is connected to the AC input 812. A pre-charge circuit 830 (for example, pre-charge circuit 830) is connected to the rectifier 861 and the inverters 820. The connection between the pre-charge circuit 830 and each of the inverters 820 is depicted in FIG. 9B using inverter 820-1 as an example. The rectifier 861 and the pre-charge circuit may be included together, or they may be separate. The pre-charge circuit 830 includes a resistor 832 and a pre-charge contactor (switch) 834.

In at least one embodiment the remaining inverters (for example, inverters 820-2, 820-3 and 820-4) have the same features, and in some embodiments are identical to inverter 820-1. Moreover, while this discussion may assume a three-phase inverter, other embodiments utilize single-phase inverters while still other embodiments utilize split-phase inverters.

Figure 10:
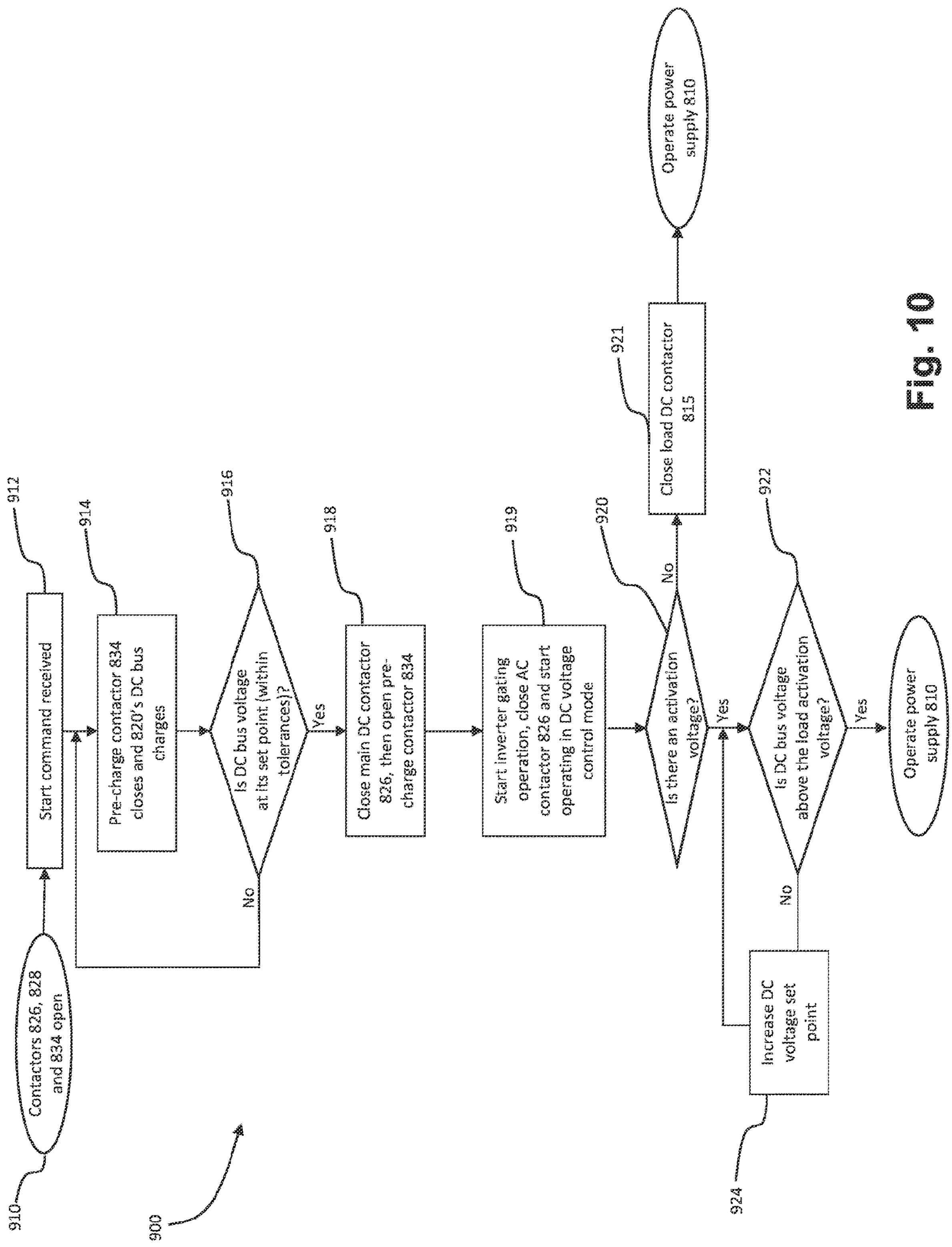

Depicted in FIG. 10 is a startup sequence 900 for the power supply 810 according to embodiments of the present disclosure. When not in use, the power supply 810 is idle with its contactors (contactors 826, 828 and 834) typically being open as depicted in step 910. A start command 912 for the power supply 810 may be given from a local user interface, such as touch screen, or a remote interface (for example, being received through a remote interface from a higher level controller 119) using one of a variety of communication protocols. Once the start command 912 is received by the inverters 820 (such as being received from controller 116), each of the inverters 820 is pre-charged with the pre-charge contactor 834 closing and the power supply's 810 DC bus charging, as shown in step 914. In some embodiments the internal DC buses of the inverters 820 include one or more capacitors.

In some embodiments of the present disclosure, inverters 820 utilize gate synchronization and/or zero sequence current control.

Pre-charging 914 continues until the voltage on the DC bus for each inverter 820 is within a preset tolerance of the rectified mains AC voltage, which is the rectified AC voltage at the AC port 812. As an example, for a mains input voltage of 600V line-line RMS, the DC bus would charge to approximately 850 VDC. An approximation that may be used with embodiments of the present disclosure is that the rectified voltage is 1.35 to 1.4 times the AC RMS voltage. Note that the main contactor 826 for each inverter 820 is open during pre-charging 914.

At step 916 a determination is made, such as by the controller 116 and/or controller 119, whether the charging of each of the inverters 820 is complete, which will occur when the DC bus voltage of each inverter is at its DC voltage set point. In some embodiments the DC voltage set point for each inverter equals the peak mains AC voltage. In some embodiments the determination of whether the DC bus voltage of each inverter 820 is at its set point is made by evaluating whether the DC bus voltage of each inverter 820 is within a predetermined threshold (for example, within 20V) of the peak mains AC voltage. When charging is determined to be complete (for example, the DC voltage of each inverter 820 is at its set point), which results in a "Yes" at step 916, the main contactor 826 is closed as shown in step 918. Then, following the closing of the main DC contactor 826, the pre-charge contactor 834 is opened as also shown in step 918. Gating begins after the pre-charge contactor 834 is opened. In some embodiments the predetermined threshold for the DC bus voltage is ±5% of the rectified peak mains AC voltage (which typically avoids excessive current inrush), while in additional embodiments the predetermined threshold for the DC bus voltage is ±2.5% of the rectified peak mains AC voltage (which is typically sufficient to counter measurement errors).

With the DC contactor 826 closed, the inverters 820 will begin operating/gating (for example, operating in a DC voltage control mode) and control the DC bus voltage to an initial DC bus voltage set point as shown in step 919. This initial DC bus voltage set point may be received by controller 116 or from the higher-level controller 119 based on the needs of the application. It is noted that the higher level controller 119 (and/or the controller 116) may operate in a current control mode (for example, a DC current control mode) where the controller measures the current (and/or voltage) at the output 814 of the power system 810 and sends voltage commands (for example, set points) to the inverters 820 to achieve the desired current, while the inverters 820 operate in a voltage control mode to achieve the commanded voltage.

In some embodiments startup sequence 900 also includes a determination of whether there is a load activation voltage, such as depicted in FIG. 10 with optional step 920. A load activation voltage is a voltage above which the DC load (the load that is connected to the power supply 810 at the DC output 814) is activated (connected to the power supply 810) and starts drawing power from the power supply 810. Below the load activation voltage, the power draw from such loads is minimal and substantially below the power rating (for example, less than 10% of the power rating) of a single inverter 820. In some embodiments the initial DC bus voltage set point for each inverter 820 in the power supply 810 is below the load activation voltage. Moreover, in some embodiments the load activation voltage and/or the DC bus voltage set point are sent to controller 116 from the higher level controller 119.

Step 920 can be in virtually any location in startup sequence 900, the precise location varying depending on the application. In some embodiments step 920 occurs before step 910. In still further embodiments the determination made in step 920 is preset into startup sequence 900 so that startup sequence 900 "assumes" the need to accommodate a load activation voltage, such as in embodiments where the user presets during installation whether or not power supply 810 is connected to an active load (a load that is active even when not receiving power from the power system 810, which is also referred to as a load that is "always active") and requires a minimum power supply voltage prior to the load connecting to the power supply.

In embodiments where there is no load activation voltage ("No" in step 920), the load DC contactor(s) 815 close connecting the load to the power supply 810 at step 921. The startup sequence 900 for this result of step 920 ends with power supply 810 operating normally and powering the load.

In embodiments where the load has a load activation voltage ("Yes" at step 920), and for which the example power system 810 in FIGS. 9A and 9B may be utilized, the startup sequence 900 will determine at step 922 whether the DC bus voltage of the power supply 810 is above the load activation voltage. If the DC bus voltage is not above the load activation voltage ("No" at step 922), the main DC contactors 828 internal to inverter 820-1 (main DC contactors 828A-1 and 828B-1) will remain closed and the DC voltage set point will be increased at step 924. Steps 922 and 924 will iterate/loop until the DC bus voltage is above the load activation voltage.

When the DC bus voltage of the power supply 810 is above the load activation voltage ("Yes" at step 922), pre-charge contactor 834 is commanded open, the main DC contactor 826 is commanded closed, and the main DC contactors 828 within inverters 820 are commanded to remain closed, resulting in the DC load being connected to and powered by the power supply 810. The startup sequence 900 for "Yes" results at steps 920 and 922 ends with power supply 810 operating normally and powering the load.

Example DC loads that power supply 810 is suited to provide power include hydrogen generation applications where the power supply 810 may be connected to a hydrogen electrolyzer and the DC load may be referred to as the electrolyzer load As used herein the term "contactor" is meant to indicate a switch that controls electrical current. Other types of switches that perform the functions described herein are contemplated and include, but are not limited to, electrical relays and solid state switches.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, . . . . N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

ELEMENT NUMBERING

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| | |
|---|---|
| 101 | grid |
| 102 | transformer |
| 103 | 3-phase AC |
| 110 | power supply |
| 112 | AC input |
| 114 | DC output |
| 115 | power supply output contactor |
| 116 | controller |
| 119 | higher level controller |
| 120 | inverter |
| 122 | AC port |
| 124 | DC port |
| 125 | power switch arrangement |
| 126 | main AC contactor |
| 128 | main DC contactor |
| 130 | AC pre-charge circuit |
| 132 | resistor |
| 134 | pre-charge contactor |
| 135 | current direction |
| 136 | voltage |
| 200 | start-up procedure(s) |
| 210 | initial step/conditions |
| 212 | receipt of start command |
| 214 | pre-charging begins |
| 216 | pre-charging complete? |
| 218 | pre-charging ends |
| 220 | is there an activation voltage? |
| 222 | is power system voltage sufficient? |
| 224 | increase power system voltage |
| 226 | connect to load |
| 310 | power supply |
| 312 | AC input |
| 314 | DC output |
| 315 | power supply output contactor |
| 420 | inverter |
| 425 | power switch arrangement |
| 426 | main AC contactor |
| 427 | capacitor |
| 428 | DC output contactor |
| 430 | AC pre-charge circuit |
| 432 | resistor |
| 434 | pre-charge contactor |
| 436 | DC output |
| 442 | capacitor |
| 444 | inductor |

TABLE 1-continued

| | |
|---|---|
| 446 | transistor |
| 448 | diode |
| 520 | inverter |
| 525 | power switch arrangement |
| 526 | main AC contactor |
| 527 | capacitor |
| 528 | DC output contactor |
| 530 | AC pre-charge circuit |
| 532 | resistor |
| 534 | pre-charge contactor |
| 536 | DC output |
| 542 | capacitor |
| 544 | inductor |
| 546 | transistor |
| 548 | diode |
| 620 | inverter |
| 625 | power switch arrangement |
| 626 | main AC contactor |
| 627 | capacitor |
| 628 | DC output contactor |
| 630 | AC pre-charge circuit |
| 632 | resistor |
| 634 | pre-charge contactor |
| 636 | DC output |
| 642 | capacitor |
| 644 | inductor |
| 646 | transistor |
| 648 | diode |
| 720 | inverter |
| 725 | power switch arrangement |
| 726 | main AC contactor |
| 727 | capacitor |
| 728 | DC output contactor |
| 730 | AC pre-charge circuit |
| 732 | resistor |
| 734 | pre-charge contactor |
| 736 | DC output |
| 742 | capacitor |
| 744 | inductor |
| 746 | transistor |
| 748 | diode |
| 810 | power supply |
| 812 | AC input |
| 820 | inverter |
| 822 | AC port |
| 814 | DC output |
| 824 | DC port |
| 825 | power switch arrangement |
| 826 | main AC contactor |
| 828 | DC output contactor |
| 830 | DC pre-charge circuit |
| 832 | resistor |
| 834 | pre-charge contactor |
| 836 | DC output |
| 861 | rectifier |
| 900 | start-up procedure(s) |
| 910 | initial step/conditions |
| 912 | receipt of start command |
| 914 | pre-charging begins |
| 916 | pre-charging complete? |
| 918 | pre-charging ends |
| 920 | is there an activation voltage? |
| 922 | is power system voltage sufficient? |
| 924 | increase power system voltage |
| 926 | connect to load |

The use of a prefix for an element number (for example, the "N" prefix in NXX-Z) refers to an element that is the same as an element with the same number but a different prefix (for example, the "M" prefix in element number MXX-Y) unless shown and/or described differently. As an example, element 420-1 is the same as element 120-1 except for those features of element 420-1 that are shown and/or described as being different from element 120-1. Further, common elements and common features of related elements may be (but are not necessarily) drawn in the same manner and/or may (but not necessarily) use the same symbology in different figures. As such, the features of elements with the same number but different prefixes are not necessarily described as being the same (for example, the features of elements 420-1 and 120-1 that are the same are not necessarily described as being the same) since these common features are apparent to a person of ordinary skill in the related field of technology. Still further, the features in elements with the same number but different prefixes are cross-compatible such that an element with one prefix (for example, element NXX-Z) may be used where an element with another prefix (for example, element MXX-Y) is used as would be understood by those of ordinary skill in the art unless described otherwise. Elements with one prefix (for example, the prefix "N") may also be referred to as being in one series (for example, the "N-series") while elements with another prefix (for example, the "M" prefix) may be referred to as being in another series (for example, the "M-series").

Moreover, the use of a suffix for an element number (for example, the "B" or the "Z" suffix in NXXB-Z) refers to an element that is the same as an element with the same number but a different suffix (for example, the "A" or "Y" suffix in element number MXXA-Y) unless shown and/or described differently. For example, element 120-2 is the same as element 120-1 except for those features of element 120-2 that are shown and/or described as being different from element 120-1, and element 446A-1 is the same as element 446B-1. Further, common elements and common features of related elements may be (but are not necessarily) drawn in the same manner and/or may (but not necessarily) use the same symbology in different figures. As such, the features of elements with the same number but different suffixes are not necessarily described as being the same (for example, the features of elements 120-2 and 120-1 (and/or elements 446A-1 and 446B-1) that are the same are not necessarily described as being the same) since these common features are apparent to a person of ordinary skill in the related field of technology. Still further, the features in elements with the same number but different suffixes are cross-compatible such that an element with one suffix (for example, element 120-2 or element 446A-1) may be used where an element with another suffix (for example, element 120-1 or element 446B-1, respectively) is used as would be understood by those of ordinary skill in the art unless described otherwise.

What is claimed is:

1. A power supply system, comprising:

at least two inverter units having respective AC input ports connected in parallel and respective DC output ports connected in parallel, each inverter unit including:

a main AC contactor configured for connection to a mains AC power source;

a main DC contactor; and an AC pre-charge circuit connected in parallel with the main AC contactor and including a pre-charge resistor and an AC pre-charge contactor, and a controller configured to command startup of the at least two inverter units;

wherein, during startup, each inverter unit is configured to close its AC pre-charge contactor to charge an internal DC bus through the pre-charge resistor while the main AC contactor remains open, and, after the internal DC bus reaches a voltage within a predetermined threshold of a rectified voltage of the mains AC power source, to close the main AC contactor and open the AC pre-charge contactor.

2. The power supply system of claim 1, wherein the respective DC output ports are configured for connection to a DC load having a power demand greater than a power rating of any one of the at least two inverter units.

3. The power supply system of claim 1, wherein the at least two inverter units comprise four inverter units.

4. The power supply system of claim 3, wherein each of the four inverter units has a power rating of about 1.5 megawatts.

5. The power supply system of claim 1, wherein the predetermined threshold is within 20 volts of the rectified voltage of the mains AC power source.

6. The power supply system of claim 1, wherein the predetermined threshold is within ±5% of the rectified voltage of the mains AC power source.

7. The power supply system of claim 1, wherein the internal DC bus of each inverter unit includes one or more capacitors.

8. The power supply system of claim 1, wherein, for each inverter unit, the AC pre-charge contactor extends across two poles or three poles of the main AC contactor.

9. The power supply system of claim 1, wherein the controller communicates with the at least two inverter units through a controller area network bus.

10. The power supply system of claim 1, wherein the at least two inverter units are configured for synchronized gating.

11. The power supply system of claim 10, wherein one inverter unit is configured as a master inverter unit and at least one other inverter unit is configured as a slave inverter unit synchronized to the master inverter unit.

12. The power supply system of claim 1, wherein each inverter unit comprises a three-phase inverter configured to perform zero sequence current control.

13. The power supply system of claim 1, wherein, after opening the AC pre-charge contactor, each inverter unit is configured to operate in a DC voltage control mode.

14. The power supply system of claim 13, wherein each inverter unit is configured to adjust a DC voltage set point according to a droop characteristic based on measured DC output current or measured DC output power.

15. The power supply system of claim 1, wherein the respective DC output ports are configured for connection to a hydrogen electrolyzer.

16. A power supply system, comprising:

at least two inverter units having respective AC input ports connected in parallel and respective DC output ports connected in parallel;

a rectifier having an input connected to the respective AC input ports and an output connected to a DC pre-charge circuit;

wherein the DC pre-charge circuit is connected to positive and negative sides of the respective DC output ports and includes a pre-charge resistor and a pre-charge contactor; and a controller configured to command startup of the at least two inverter units by charging respective internal DC buses of the at least two inverter units through the rectifier and the DC pre-charge circuit before operating the at least two inverter units to provide DC power at the respective DC output ports.

17. The power supply system of claim 16, wherein each inverter unit includes a main contactor that remains open while the respective internal DC bus is charged through the rectifier and the DC pre-charge circuit.

18. The power supply system of claim 16, wherein, after the respective internal DC buses are charged, the at least two inverter units are configured to begin operating in a DC voltage control mode.

19. The power supply system of claim 16, wherein the respective DC output ports are configured for connection to a DC load having a power demand greater than a power rating of any one of the at least two inverter units.

20. A method of starting a power supply system having at least two inverter units with respective AC input ports connected in parallel and respective DC output ports connected in parallel, the method comprising:

issuing a start command to the at least two inverter units;

in each inverter unit, closing an AC pre-charge contactor of an AC pre-charge circuit connected in parallel with a main AC contactor;

charging an internal DC bus of each inverter unit through a pre-charge resistor of the AC pre-charge circuit while the main AC contactor remains open;

determining that the internal DC bus of each inverter unit has reached a voltage within a predetermined threshold of a rectified voltage of a mains AC power source; and after the determining, closing the main AC contactor and opening the AC pre-charge contactor of each inverter unit.

* * * * *